(12) United States Patent
Sorensen

(10) Patent No.: US 7,652,687 B2
(45) Date of Patent: Jan. 26, 2010

(54) STILL IMAGE QUEUE ANALYSIS SYSTEM AND METHOD

(75) Inventor: Herb Sorensen, Troutdale, OR (US)

(73) Assignee: Sorensen Associates Inc., Troutdale, OR (US)

( * ) Notice: Subject to any disclaimer, the term of this patent is extended or adjusted under 35 U.S.C. 154(b) by 105 days.

(21) Appl. No.: 11/737,071

(22) Filed: Apr. 18, 2007

(65) Prior Publication Data

US 2007/0253595 A1    Nov. 1, 2007

Related U.S. Application Data

(60) Provisional application No. 60/793,112, filed on Apr. 18, 2006.

(51) Int. Cl.
    *H04N 7/18* (2006.01)
(52) U.S. Cl. ...................................... 348/150
(58) Field of Classification Search .................. 348/150
    See application file for complete search history.

(56) References Cited

U.S. PATENT DOCUMENTS

| | | | | |
|---|---|---|---|---|
| 4,700,295 A | | 10/1987 | Katsof et al. | |
| 4,924,416 A | * | 5/1990 | Sasao | 382/100 |
| 5,097,328 A | * | 3/1992 | Boyette | 348/150 |
| 5,465,115 A | * | 11/1995 | Conrad et al. | 348/155 |
| 5,581,625 A | | 12/1996 | Connell | |
| 6,195,121 B1 | * | 2/2001 | Huang et al. | 348/150 |
| 6,587,119 B1 | * | 7/2003 | Anderson et al. | 345/672 |

OTHER PUBLICATIONS

Isa European Patent Office, Search Report of EP 07755893.0, Mar. 27, 2009, Germany.

* cited by examiner

*Primary Examiner*—David Czekaj
(74) *Attorney, Agent, or Firm*—Alleman Hall McCoy Russell & Tuttle LLP

(57) ABSTRACT

A system and method for analyzing a queue. The method may comprise defining a queue and evaluating a series of still images of the queue zone at periodic intervals over a predefined period of time. The method may further comprise approximating an estimated average number of people in the queue over the interval during which the still image was taken to be a number of people counted in the queue zone minus one person who is assumed to be engaged in a transaction. The method may further comprise calculating an estimated average number of the people in the queue over the predefined period by averaging estimated average number of people over intervals within the predefined period. The method may further comprise determining a measure of a queue length based on the estimated average number of people in the queue over the predefined period.

11 Claims, 4 Drawing Sheets

STILL IMAGE QUEUE ANALYSIS SYSTEM AND METHOD

CROSS-REFERENCE TO RELATED APPLICATION

This application claims priority under 35 U.S.C. § 119 to U.S. provisional patent application Ser. No. 60/793,112, entitled STILL IMAGE QUEUE ANALYSIS SYSTEM AND METHOD, filed on Apr. 18, 2006, the entire disclosure of which is herein incorporated by reference.

TECHNICAL FIELD

The present invention relates generally to a queue analysis system, and more particularly to analysis of queues using still images.

BACKGROUND

In the past, various customer tracking methods have been employed in retail locations to monitor customer shopping habits, in order to improve advertising and retail store layouts. These methods typically involve installing video cameras throughout a retail location, recording customers, and analyzing the video. However, the use of video cameras for monitoring can be quite costly. Furthermore, continuous video monitoring creates a large amount of footage which needs to be stored and analyzed. The cost and time associated with video analysis are a barrier to the widespread adoption prior continuous video monitoring techniques for analysis of customer shopping habits.

SUMMARY

The inventor herein has recognized that it may be desirable to use still image technology to analyze queues that form in shopping environments and other locations. Still image technology analyzes still images captured at periodic intervals, as opposed to continuous video monitoring. Still image technology can be utilized in a variety of applications where low cost monitoring and analysis may be desired. One application is queue monitoring and analysis for improved queue management.

A system and method is provided for performing analysis on shopper queues via still images, in particular, determining an average queue length during a period of aggregation. According to one aspect, a method for analyzing a queue comprises defining a queue; evaluating a series of still images of the queue zone at periodic intervals over a predefined period of time; approximating an estimated average number of people in the queue over the interval during which the still image was taken to be a number of people counted in the queue zone minus one person who is assumed to be engaged in a transaction; calculating an estimated average number of the people in the queue over the predefined period by averaging estimated average number of people over intervals within the predefined period; and determining a measure of a queue length based on the estimated average number of people in the queue over the predefined period.

According to another aspect, a queue analysis system in a designated location comprises at least one image generating device configured to capture a series of still images of people in a queue at periodic intervals over a predefined period of time; a transaction data generating device configured to record a check time of each person in the queue; an image analysis system communicating with the image generating device and the transaction data generating device through a network, wherein the image analysis system is configured to estimate a queue length to be one of an estimated average number of people in the queue over the predefined period and an estimated average period wait time of people in the queue over the predefined period.

According to yet another aspect, a method for analyzing a queue comprises defining a queue zone including a wait zone and a transaction zone; evaluating a series of still images of the queue zone obtained at periodic intervals over a predefined period of time; for each still image, approximating an estimated average number of people in the queue to be a first number of people counted in the wait zone plus a second number of people counted in the transaction zone minus one person who is assumed to be engaged in a transaction; and for each still image, approximating an estimated average interval wait time of people in the queue to be a sum of an individual check time of each person wherein the individual check time is the elapsed checkout time between two consecutive people; and determining a measure of a queue length to be one of an estimated average number of people in the queue and an estimated average interval wait time.

The systems and methods described herein have the potential advantage that they may be capable of more efficient queue analysis than prior continuous video based systems, with possible cost and time savings.

DETAILED DESCRIPTION

Figure 1:
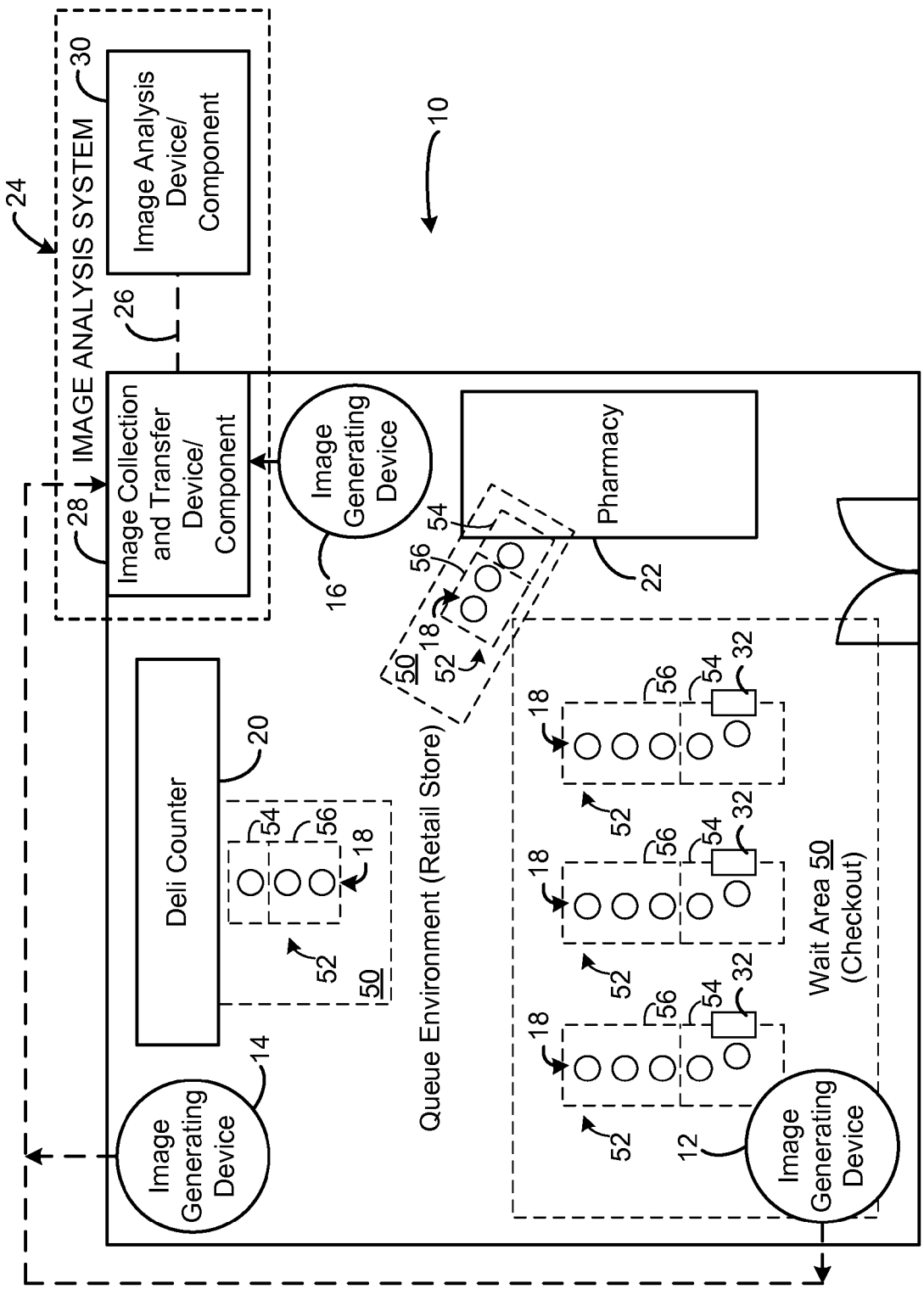
FIG. 1 is a schematic view of an exemplary queue analysis system of the present disclosure.

FIG. 1 shows a schematic view of an exemplary queue analysis system 10 using still image technology. This non-limiting example depicts a queue monitoring system installed in a retail store. It should be appreciated that the queue monitoring system may be installed in other locations where a queue is formed and queue management is required. Some example locations include, but are not limited to theme park, theatres, arenas, stadiums, airport, train stations, bus terminals, toll booths, boarder crossings, airport runways, and ports.

Queue analysis system 10 may include a plurality of image generating devices 12, 14, 16 installed to monitor the major wait areas 50 in the store. In the depicted embodiment, image generating device 12 is positioned to monitor three queues 18 in the form of checkout lines, image generating device 14 is positioned to monitor a queue 18 at a deli counter 20, and image generating device 16 is positioned to monitor a queue 18 at a pharmacy 22. Each queue 18 is formed of individual customers represented as circles in FIG. 1, and lies within a queue zone 52 of a wait area 50 which are explained in detail with reference to FIG. 2.

The image generating device may be a camera, for example. Monitoring the queue may include capturing still images of the queue via the camera, for example, at periodic intervals such as every 5 or 10 minutes. It will be appreciated that other suitable image generation devices and intervals may be employed. For example, the cameras may be power-over-Ethernet (POE) cameras, or other suitable camera configured to capture still images of a queue. The intervals may be, for example, selected from a range between 1 and 20 minutes, or may be larger or smaller, as needed. In the depicted embodiment, one camera is shown to capture still images in a wait area, which includes at least one queue zone.

However, it should be noted that alternatively a plurality of cameras may be used to capture still images in a wait area. For example, two or more cameras may be employed to capture still images of the three checkout lines shown in FIG. 1. Further, the location of the illustrated queue zones is exemplary. The selection of queue zones to monitor is matter of choice, and thus it should be appreciated that other queue zones in the retail store may be monitored, such as for example, the fresh meat counter or any other areas where customers or shoppers may form a queue.

Queue analysis system 10 may also include an image analysis system 24 that communicates with image generating devices 12-16 through any suitable network connection 26. Image analysis system 24 may further include an image collection and transfer component 28 and an image analysis component 30. In some embodiments, image collection and transfer component 28 and image analysis component 30 may be integrated in one computing device, collectively referred to as image analysis device 24. In other embodiments, image collection and transfer component 28 and image analysis component 30 may be separate devices placed at different locations and connected by a computer network. For example, image collection and transfer component 28 may an image collection and transfer device such as a "stomp box" or a personal computer (PC), which is installed at the retail store, and image analysis component 30 may be an image analysis device 30 such as a computing device installed at a data analysis center located at a place other than the retail store. In the above example, images collected from image generating devices may be transferred or staged to the "stomp box" or PC, and then transmitted to image analysis device 30 at a data analysis center through any suitable network connection, such as a wireless virtual private network (VPN) through the internet.

Queue analysis system 10 may also include a transaction data generating device 32 configured to record a transaction time or checkout time of people in the queue. In some embodiments, transaction data generating device 32 may be a checkout register in the retail store. Transaction data generating device 32 may record sale transactions, such as items sold, sale prices, and a checkout time for each sale transaction. Data from transaction data generating device 32 may be used to form a transaction log, referred to as a "T-log".

Figure 2:
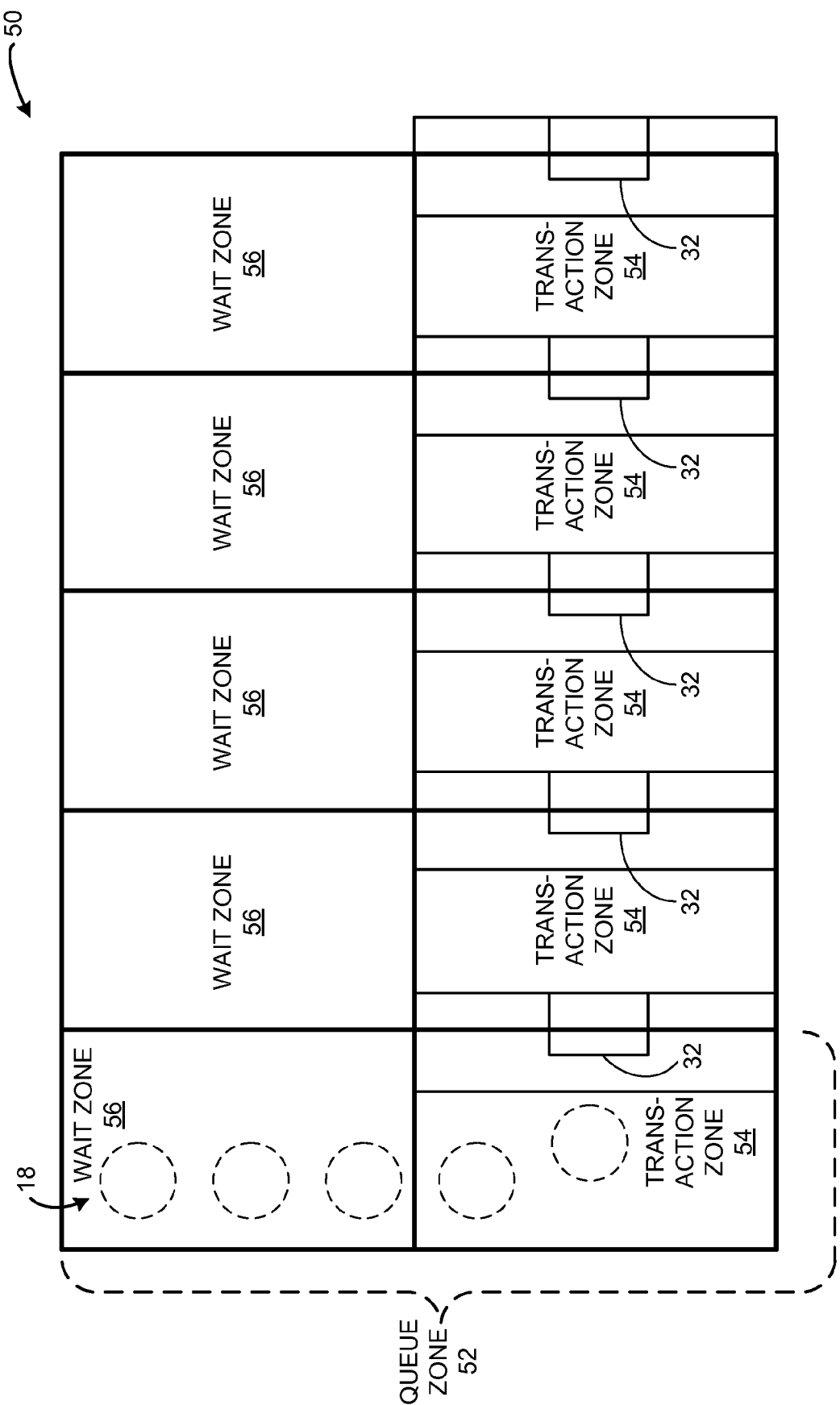
FIG. 2 is a schematic view of checkout zones monitored during queue analysis.

FIG. 2 illustrates in detail a schematic diagram of a typical wait area 50 where the still image queue analysis system in FIG. 1 may be implemented. The wait area 50 illustrated in FIG. 2 is similar to the checkout wait area illustrated in FIG. 1, however the concepts described hereinafter apply to other types of wait areas, such as deli counter and pharmacy wait areas 50 illustrated in FIG. 1. In the depicted embodiment, the wait area is within a retail store; however, as described below the system and methods described herein are applicable to a variety of environments in which queues form. As shown in FIG. 2, wait area 50 may include a plurality of queue zones 52. As illustrated both in FIG. 1 and FIG. 2, each queue zone 52 may be divided into a transaction zone 54 and a wait zone 56. Transaction zone 54 may be within a merchandise unloading area and adjacent to a checker at a transaction data generating device 32 (e.g., checkout register), or adjacent to transaction data generating device 32 configured as self-checkout equipment. Wait zone 56 may be in an area in which a queue formation occurs. In the embodiments depicted in FIGS. 1 and 2, the queue analysis system is configured so that a single image generating device can monitor three queue zones. It should be appreciated that the number and placement of image generating devices for the queue zones may vary, and virtually any suitable configuration of image generating devices may be used, so long as still images of sufficient quality for each queue zone are attainable by the image generating devices.

Once the still images captured from the image generating device at periodic intervals are collected, queue analysis can be conducted. Still image queue analysis may be based on a sampling scheme as opposed to a census scheme, which is used in continuous video monitoring. Typically, the still image queue analysis includes analyzing a queue length. In some embodiments, a queue length may be measured by an estimated average number of people in a queue. The estimation of an average number of people in the queue may be accomplished by tallying or counting people in the queue by photo monitoring technicians. Alternatively, estimation of the average number of people in the queue may be accomplished by an automated monitoring system without the need for photographic analysis technicians. The automation process will be described in further detail below.

Alternatively or additionally, the queue length may be measured by an estimated average wait time of people in the queue. The estimation of the average wait time of people in the queue may be accomplished by analyzing still images and transaction data corresponding to each still image. For example, still image data may be merged with the stream of sales transactions recorded on a register transaction log of the retail store. By merging these two sources of data, the estimated average wait time may be obtained through reasonable analysis as described below.

As described above, in some embodiments, still image data alone may be employed to analyze a queue, i.e., an estimated average number of people in the queue may be used to measure the queue length. As an example, if an image is captured every five minutes, that single still image may be understood to represent the best and only available knowledge of the condition of the queue until the next image is captured. Based on this premise, the following equation can be used to approximate the estimated average number of people in the queue:

$$Ni=N-1$$

where Ni is the estimated average number of people in the queue during the interval represented by the photo, and N is the number of people in the queue. In other words, the estimated average number of people in the queue is the imputed queue length (until data is updated, i.e. when the next photo is taken).

In the embodiment depicted in FIG. 2, the following equation may be used to estimate the average number of people in the queue:

$$Ni=Nw+Nc-1$$

where Nw is a first number of people in the wait zone and Nc is a second number of people in the transaction zone. In each still image, one person is assumed to be engaged in a transaction and thus is subtracted from the number of people in the queue.

The estimated average number of people in the queue over each interval may be further averaged within a predefined period to determine an estimated average queue length over a predefined period, Na, as follows:

$$Na=(N_1+N_2+\ldots+Nm)/m$$

where $N_1$, $N_2$, Nm are estimated average number of people in the queue over individual intervals within the predefined period, and m is a number of intervals within the predefined period.

In some embodiments, the periodic intervals may be every ten or five minutes, and the predefined period may be one hour. When averaged over six still images (i.e., captured every 10 minutes) or twelve still images (i.e., captured every 5 minutes,) the resulting mean should be a very high quality average representation for a one hour period.

Moreover, a maximum queue length measured by the number of people in the queue may be estimated based on still images. For example, the maximum queue length may be estimated to be at least as large as the largest number of people observed in any one still image over the predefined period. Hence, through still image analysis, a reasonable direct measure of the average length of the queue during the period of aggregation of still images, as well as some measure of the maximum length of the queue during the same aggregation period, can be attained.

Although the above example refers to still images analyzed over a one hour period, it should be appreciated that the aggregation period can be represented by single hours, days, parts of days, days of week, weeks, months or any other suitable period. Once the analysis data is loaded into a database with the corresponding dates and times, the aggregation period can be easily adjusted.

Furthermore, it should be noted that transaction data is not required where the queue length is measured by the estimated average number of people in the queue. Thus, the particular analysis described above may be suitable for use in wait areas, such as fresh meat service, service deli, or other queue locations that do not terminate with a register checkout and transaction record.

As described above, in some embodiments, still image data may be combined with transaction data, such as in a T-log, to estimate an average wait time of people in a queue. In these cases, a queue length may be measured by an estimated average wait time of the queue. For example, in instances where checkout lanes are being monitored, the T-log can provide the exact date, time and lane number of the most recent transaction before and after a current still image is captured. As a result, the average wait time of a queue can be estimated.

In one approach, the average wait time of people in the queue can be inferred or estimated from a combined analysis of the still image data and transaction data. The presumption can be made that the customer currently facing the checker will have spent the time from the prior checkout, to the next checkout following the time of the photo, being served by the checker and having his/her own purchases tallied and totaled, i.e., this customer has been with the checker since the prior customer left. With this presumption, the elapsed checkout time between this customer and the prior customer represents the service time of this customer in the current still image. For the remaining customers in the queue, the T-log can provide the elapsed checkout time of the additional purchases which can be used to compute individual service times or check times of each customer. The wait time of the last customer in the queue may be estimated to be the sum of individual service times of each customer in the queue as represented by the following equation:

$$T_a = \Sigma(t_1 + t_2 + \ldots + t_m)$$

wherein Ta is the wait time of the last customer in the queue, $t_1$ is the check time of the customer being engaged in a transaction (a first customer in the current still image) and $t_1$ is calculated to be a difference of checkout times between this customer and a customer immediately before the current still image is taken; $t_2$ is the check time of the second customer in the still image and $t_2$ is calculated to be a difference between checkout time of the first customer and the second customer; and $t_m$ is the last customer in the still image and $t_m$ is calculated to be a difference between checkout time of the second to last customer and the last customer in the still image.

Alternatively, the wait time of the last customer in the queue may be determined as follows:

$$T_{ai} = T_{chm} - T_{ch0}$$

where $T_{chm}$ is the checkout time of the last customer in the current still image and $T_{ch0}$ is checkout time of the customer immediately before the current still image is captured.

In the above approach, each customer's wait time may not be known other than the last customer in the queue. However, a reasonable statistical inference can be made that every customer in the still image has the same total wait time as the last customer in the queue. Thus, the average wait time of the queue in a still image over an interval can be estimated. Further, an estimated average wait time over a predefined period (e.g., one hour) may be estimated by averaging the estimated average interval wait times over the predefined period as follows:

$$T_a = (T_{a1} + T_{a2} + \ldots + T_{am})/m$$

where $T_a$ is the estimated average period wait time over the predefined interval; $T_{a1}$, $T_{a2}$, and $T_{am}$ are the estimated average interval wait times over intervals within the predefined period.

One potential problem with the above approach is that it is not known whether the last customer had already been standing in the queue for some considerable time as the queue is shortened. One method to solve this potential problem is to check the prior still image to attempt to recognize the identical customer in an earlier still image. However, this method may require considerably more complex recognition work and interrelating of customers within those still images instead of simply counting photos. Another method to solve the above problems is to sample less often (i.e., to capture still images in a longer time interval) to assure that no customer occurs in more than one of the still images. In this way, the wait time can be reliably inferred or estimated. Likewise, the maximum queue length analysis can be inferred in the same statistical manner, wherein less frequent snapshots decrease the likelihood of counting a customer in a queue multiple times, thus skewing on the length measurement may be reduced. From a statistical viewpoint, the method of sampling less frequently is adequate to provide reliable estimates of the queue length (e.g., customer counts and wait times) as well as some maximum values for both.

As described above, the above statistical approach assumes that the customer being served by the checker in the still image has been with the checker since the prior customer left. If the queue is a standing queue (i.e., a queue of some duration), the presumption would be true. However, statistical analysis can become skewed when a lag time between the prior checkout and the current still image is excessive as described in detail below. Further, even if there are five customers in the queue, a single still image may not reveal whether this is a standing queue, or whether all five customers arrived in close time proximity. In other words, the queue may have been in existence for some duration, or it may have been generated quickly. The duration of the queue has no effect on estimates of a queue length in terms of numbers of customers, but does have implications for the estimates of wait times. An approach involving parsing and normalization of the transaction data (T-log data) occurring at a check register prior to the instance of the still image may determine if a queue is a standing queue. In other words, normalization of transaction data may determine whether the queue has been generated quickly or has been standing for a period of time, or whether there is an excessive lag time.

The normalization of the check time can become quite detailed, but it may be based on the normal time for a checker to check a single item. Depending on the application, the normalization may be carried out in a variety of ways. In some embodiments, specific values for specific checkers may be used; and/or specific items under specific environmental conditions may be used. For example, some checkers may work faster when their queue is longer, or when it is earlier in their shift. Further, it may take longer to check a price look up (PLU) items such as for produce or very large items; etc. In some embodiments, less detailed value normalizations may provide a desired result.

In some embodiments, the desired normalization values may be based on the number of items a checker processes per minute or may be based on a check rate defined as time taken to process one transaction item or check item. The check time obtained from this normalization is based on the elapsed time from checking out of one item till the next item and the number of items in that transaction. However, not all check time is consumed in scanning items. Some of check time may be associated with the payment process, and/or other non-scan activities, such as bagging, waiting for the next shopper, etc. In particular, time to wait for the next customer which is referred as the lag time, is most likely due to the fact that no one is in the queue. Typically, an excessive lag time may not be attributed to the customer wait time; otherwise the results may be skewed. To take into account the excessive lag time, the check time may be normalized from a large collection of pooled transaction data.

Figure 3:
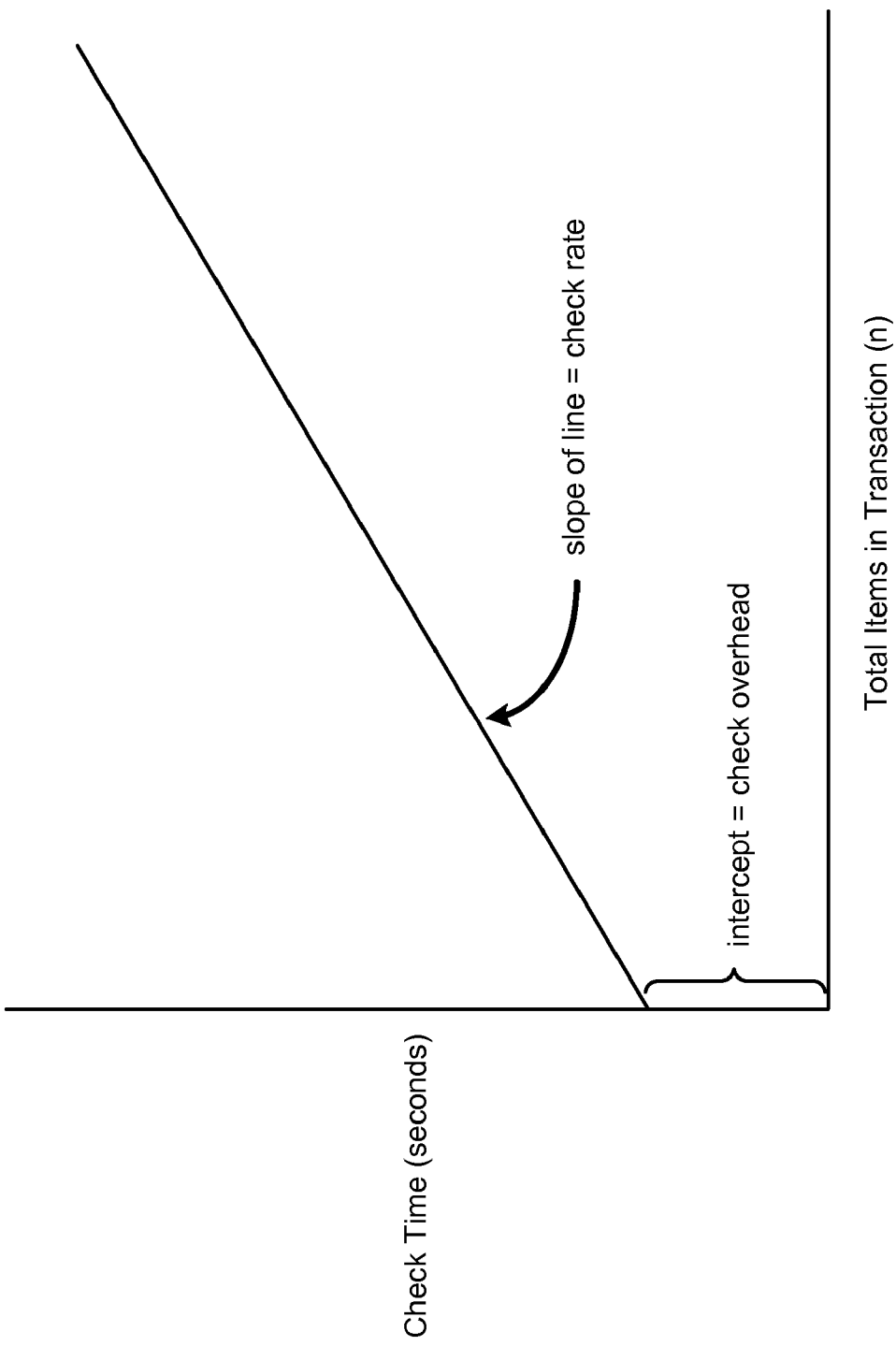
FIG. 3 is a line graph showing normalization of check time during queue analysis.

FIG. 3 is a line graph showing the normalization of the check time. The general formula for the check time is as follows:

normalized check time=check overhead+($n$×check rate)

where check overhead may be non-scanning time including payment time and lag time, check rate is the time taken to process one transaction item (seconds per item), and n is the number of items.

As shown in FIG. 3, a slope of the line equals the check rate and an intercept of the line equals the check overhead. The average slope and the intercept of the line may be computed from the pooled data. Typically, the desired "averages" are the medians, although the means may be used in some embodiments. That is, there may be a large range of these values across all checkout events. The median values may be defined as typical check overhead or normalized check overhead and the typical check rate or the normalized check rate, which in turn may define a typical check time or normalized check, Tt. The excess lag time for each customer may be determined to be a difference between the actual check time of the customer and the normalized check time based on their basket size (number of items, n). The excess lag time is the time when no one is waiting in the queue, but rather the checker is waiting for a customer to approach the checkout register. The excessive lag time typically should not be counted into the wait time of people in the queue. Thus, the normalized wait time of the queue may be obtained by subtracting the excessive lag time from the wait time calculated from each customer's check time based on transaction data. This metric can be valuable for queue management.

Furthermore, over time as more data is collected the check time, check rate, and check overhead (non-processing time) values may be updated and further changes may be made to manage queues, staffing and other aspects associated with the checkout zones.

While the above still image analysis may be performed in less frequent intervals, such as five or ten minutes, it should be noted that in some applications it may be desirable to conduct frequent still image analysis. For example, a series of still images may be captured at intervals of one minute or less, such as thirty second intervals. This may be particularly applicable for smaller sample sizes, which collect less data overall. This approach may be used to interrelate subjects from image to image. In other words, this technique can provide still images that are timed in intervals which efficiently simulate slow-motion video, which may allow detailed tracking of the behavior of a single customer and accurate determination of individual wait times, as contrasted to accurate aggregate wait time as described above. This approach may be attractive for establishing normalizations and baseline values for places, such as service delis, etc. Furthermore, this approach can be applied to analysis of the checkout lanes where T-logs are available. The normalizations as described above and baselines may be computed based on item counts, checker efficiencies, check lane, individual checker, time of day, etc.

The approach using more frequent image analysis can provide an independent tool for measuring/managing shopper queues. Alternatively, in some applications the approach can be extended to be used in conjunction with radio frequency identification (RFID) tags to provide further in depth independent product and/or customer analysis.

Another exemplary embodiment of the queue monitoring and management system may be the use of a fully automated system. The automation may eliminate the need for photographic analysis technicians to count the number of people in the still images. In addition to count the people in the still images, the automation process may include de-selection of all photographs that have no queue formed, removal of background items for consistent number counts or queue counts, quantization of foreground objects and relating them to customers (or in the case of out-of-stock item displays for fulfillment audits), and integration of analysis reports. The automated system may also include a photograph file management system.

Further, detailed results may be produced via an on-demand report as a result of the automation process. The report may include how long customers wait at a checkout before getting to a checker, how long customers wait to actually be checked out, how long the checker waits between customers (when there is no queue), as well as details such as time, check lane number, checker name/identification, etc.

It should be appreciated that the automated system may also produce similar reports for queues in other wait areas, such as, the pharmacy, the fresh meat counter, the service deli, etc.

Figure 4:
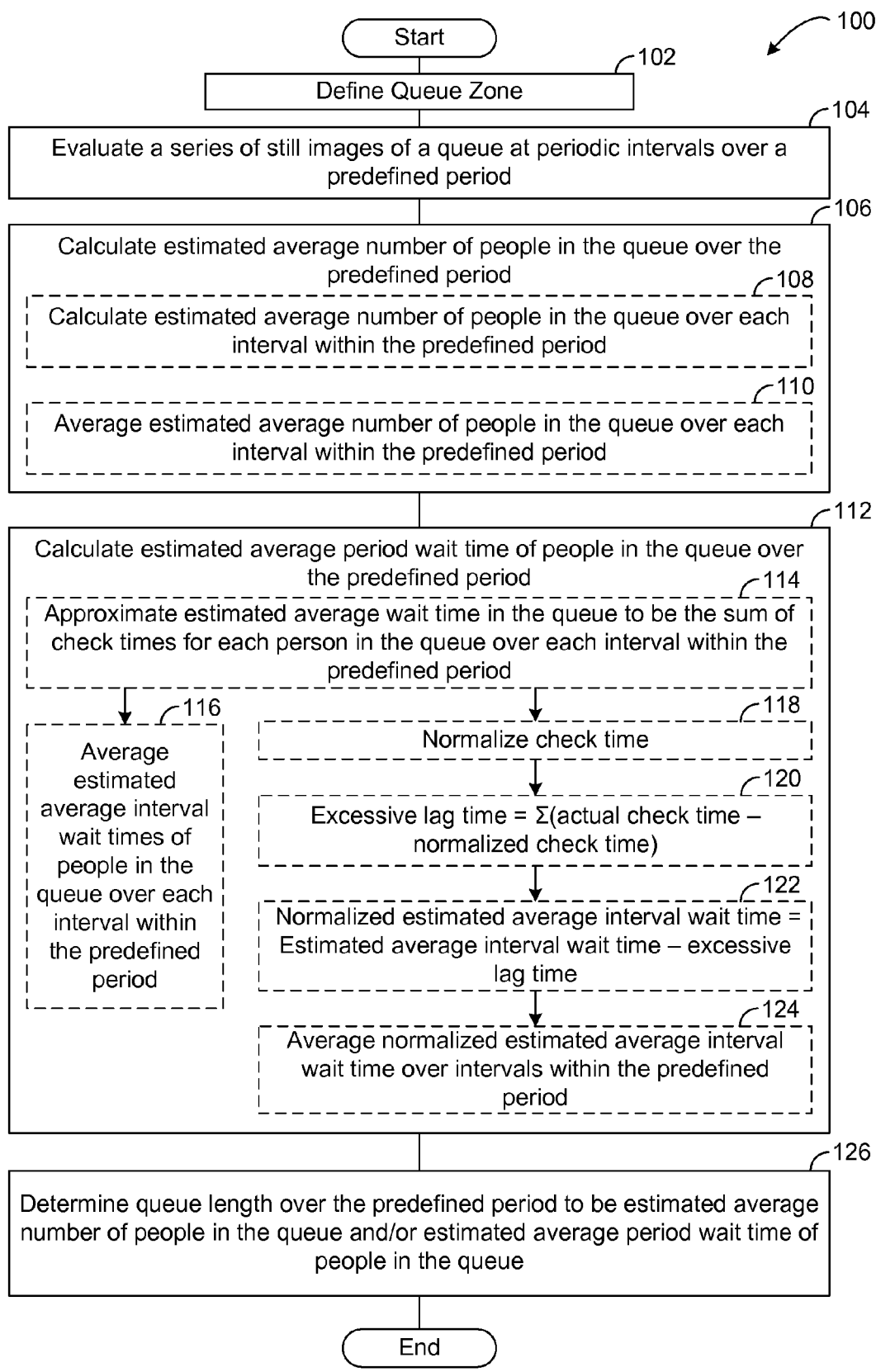
FIG. 4 is a flowchart illustrating an exemplary method for analyzing a queue.

FIG. 4 shows a flowchart illustrating an example method 100 for analyzing a queue in a designated location. First, at 102, method 100 includes defining a queue zone. In some embodiments, the queue may be formed in a checkout area in a retail store. Alternatively, the queue may be formed in another queue environment. In addition, the queue zone may be defined to include a wait zone and a transaction zone.

Next, at 104, method 100 includes evaluating a series of still images of the queue at periodic intervals over a predefined period. The still images typically are captured by an image generating device. As described above, the still images may be evaluated by an image analysis device located at the retail store. Alternatively, the still images may be transferred to a data analysis center and evaluated by an image analysis device at the data analysis center. In some embodiments, the periodic intervals may be every five or ten minutes. In other embodiments, the periodic intervals may be more frequent intervals, such as every thirty second interval or one minute interval. In some embodiments, the predefined period may be longer intervals, such as an hour or more. It should be noted that any suitable interval or period may be used.

Next, at 106, method 100 includes calculating an estimated average number of people in the queue over the predefined period. In some embodiments, calculating the estimated average number of people in the queue over the predefined period may include several steps as indicated by 108 and 110. For example, at 108, method 100 may include approximating an estimated average number of people in the queue over an interval to be a number of people in the queue zone minus one person who is assumed to be engaged in checkout or in a transaction. At 110, method 100 may include averaging an estimated average number of people in the queue over intervals within the predefined period to obtain the estimated average number of people in the queue over the predefined period.

Continuing with FIG. 4, at 112, method 110 includes calculating an estimated average period wait time of the queue over the predefined period. Calculating the estimated average period wait time of the queue may include one or more substeps. For example, at 116, method 100 may include approximating the estimated average interval wait time of the queue to be a sum of check times for each person in the queue. As described above, check times may be obtained from transaction data such as a T-log for a transaction data generating device. Next, at 116, method 100 includes averaging the estimated average interval times over intervals within the predefined period to obtain the estimated average period wait time of the queue.

Alternatively, continuing from step 114, at 118, check time may be normalized in order to determine an excessive lag time that may not contribute to waiting of people in the queue. Normalizing the check time may include regressing check time versus total items in transaction from a large number of pooled data to obtain a projected typical check time or normalized check time. At 120, the excessive lag time may be determined to be an aggregation of a difference between an actual check time of a person and normalized check time. At 122, a normalized estimated average interval wait time for one still image may be determined by subtracting the excessive lag time from the estimated average interval wait time. Next, at 124, method 100 may include averaging normalized estimated average interval wait time over intervals within the predefined period to obtain the normalized estimated average period wait time of the queue.

Next, at 126, method 100 includes determining a queue length over the predefined period to be one of the estimated average number of people in the queue and/or the estimated average period wait time of the queue over the predefined. As described above, in some embodiments, the estimated average number of people in the queue may be used as a measure of the queue length over the predefined period. In some embodiments, the estimated average wait time may be used as a measure of the queue length separately or in combination with the estimated average number of people in the queue.

The system and method described above have the potential advantage that they can more efficiently analyze queues as compared to prior continuous video monitoring system, with potential cost and time savings.

The output of the methods described herein may be used in real time to control management of queues, for example, by deploying store resources based on the determined queue lengths. A predictive control algorithm may executed by the image analysis system, which takes as input the queue lengths determined above, and also data from other store measurements, such as counts of customers at entrances and exits to the retail store, and compares these real-time measurements to historical statistical data of queue lengths and entrance and exit data, and produces as output based on these comparisons a prediction of when and where queues are likely to form within the store, including specific predicted queue lengths and predicted wait areas or queue location within the retail store at which those predicted queues lengths are likely to form. The predicted queue lengths may be expressed in both a predicted average number of people and a predicted average wait time for a queue, as described above.

This predictive ability is of value to management because the system can control deployment of resources to address predicted queue lengths. For example, the image analysis system may be configured to determine that the predicted queue length at a predicted queue location is beyond a predetermined threshold for that location and time, and send an alert to a store employee. The alert may be in the form of an automatic visual and/or audible page to store employees to assist at checkout registers, or an automated phone call, pager message, or other form of message to alert a store manager or other staff member as to the probable formation of a queue of excessive length (based on predicted average number of people and/or wait time) at some period in advance of the predicted time of the queue length exceeding the threshold, such as two minutes and/or five minutes beforehand.

Although the above example embodiments have been described for use in a retail store, it should be appreciated that the methods and systems described herein may be applied to various other places where queue management is a priority. For example, the methods and systems could be used in theme parks for monitoring queues of people waiting for various attractions. Further, the system may be used with other entertainment venues, such as theatres, arenas, and stadiums. Furthermore, the system may be used in travel applications, such as for monitoring queues in airports, train stations, and bus terminals. In some embodiments, the system may be used to monitor various vehicular queues, such as toll booths, boarder crossings, airport runways, and ports. Thus, it will be appreciated that the systems and methods herein are applicable to virtually any queue environment in which queues are likely to form, which would benefit from analysis and management.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computerized method for analyzing a queue, comprising:
   at an image generating device:
      capturing a series of still images of a queue zone at periodic intervals;
   at an image analysis device:
      evaluating the series of still images of the queue zone taken at the periodic intervals over a predefined period of time;
      approximating an estimated average number of people in the queue over the interval during which each still image was taken to be a number of people counted in the queue zone minus one person who is assumed to be engaged in a transaction;
      calculating an estimated average number of the people in the queue over the predefined period by averaging the estimated average number of people in the queue over the intervals within the predefined period; and
      determining a measure of a queue length based on the estimated average number of people in the queue over the predefined period;
   wherein the queue zone includes a wait zone and a transaction zone wherein the transaction zone includes a checkout register;
   wherein determining the measure of the queue length is further based on an estimated average period wait time of people in the queue over the predefined period wherein the estimated average period wait time is determined based on information from both the still images and transaction data from the checkout register that provides an elapsed checkout time between every two people in the queue;
   wherein determining the estimated average period wait time comprises:
      for each still image, approximating an estimated average interval wait time for each still image to be a sum of a check time of each person in the queue, wherein the check time is the elapsed checkout time between two consecutive people; and averaging the estimated average interval wait time within the predefined period to obtain the estimated average period wait time;

wherein the check time prior to each still image is normalized using the following equation:

normalized check time=check overhead+(check rate× the number of transaction items)

where the check overhead is an intercept of a line obtained from a regression of check time versus total items in transactions which occurred prior to the still image to be captured.

2. The method of claim 1, further comprising:
determining a still image having a largest number of persons counted within the queue zone over the predefined period; and
approximating an estimated maximum queue length for the queue zone over the predefined period to be equal to the largest number of persons counted in the still image.

3. The method of claim 1, wherein the check overhead and the normalized check time are obtained from medians computed from a large collection of pooled transaction data.

4. The method of claim 3, further comprising determining a normalized average interval wait time of the queue by subtracting an excessive lag time from the estimated average interval wait time wherein the excessive lag time is an aggregate of a difference between an actual check time of each person and the normalized check time.

5. The method of claim 1, wherein the periodic interval for the still image capture is approximately in a range of five minutes to ten minutes and the predefined period is about one hour.

6. The method of claim 1, wherein the still images are captured by a camera.

7. The method of claim 1, wherein still images for a plurality of queue zones are captured by a single camera.

8. The method of claim 1, wherein the queue zone is in an environment selected from the group consisting of retail stores, theme parks, theatres, arenas, stadiums, airports, train stations, bus terminals, toll booths, boarder crossings, airport runways, and ports.

9. A queue analysis system in a designated location, comprising:
at least one image generating device configured to capture a series of still images of people in a queue at periodic intervals over a predefined period of time;
a transaction data generating device configured to record a check time of each person in the queue;
an image analysis system communicating with the image generating device and the transaction data generating device through a network, wherein the image analysis system is configured to:
estimate a queue length to be one of an estimated average number of people in the queue over the predefined period and an estimated average period wait time of people in the queue over the predefined period; and
wherein the estimated average number of the people in the queue over the predefined period is calculated as below:
the estimated average number of the people over the predefined period=

$$Na=(N_1+N_2+\ldots+Nm)/m$$

where $N_1$, $N_2$, $Nm$ are estimated average numbers of people in the queue over the intervals within the predefined period, m is a number of intervals within the predefined period, and the estimated average number of people in the queue over each interval is approximated to be a number of people counted in the still image for the interval minus one person who is assumed to be engaged in a transaction;

wherein the estimated average period wait time over the predefined period is calculated as below:

$$T_a=(T_{a1}+T_{a2}+\ldots+T_{am})/m$$

where $T_a$ is the estimated average period wait time over the predefined period; $T_{a1}$, $T_{a2}$, and $T_{am}$ are estimated average interval wait times over the intervals within the predefined period and the estimated average interval wait time is approximated to be a sum of an individual check time of each person in the still image wherein the individual check time is an elapsed checkout time between two consecutive people; and wherein a set of check times prior to the capturing of each still image is normalized using the following equation:

normalized check time=check overhead+(check rate×a number of transaction items)

where the check overhead is an intercept of a line obtained from a regression of the check time versus total items in a transaction which occurred prior to the capturing of the still image.

10. The queue analysis system of claim 9, wherein a normalized estimated average interval wait time of the queue in one still image is determined by subtracting an excessive lag time from the estimated average interval wait time wherein the excessive lag time is an aggregated difference between an actual check time of a person and the normalized check time.

11. The queue analysis system of claim 9, wherein the image generating device is a camera and the designated location is selected from the group consisting of retail stores, theme parks, theatres, arenas, stadiums, airports, train stations, bus terminals, toll booths, boarder crossings, airport runways, and ports.

* * * * *